(12) United States Patent
Myllyla et al.

(10) Patent No.: US 7,725,431 B2
(45) Date of Patent: May 25, 2010

(54) METHOD AND APPARATUS FOR THE SYNCHRONIZATION AND STORAGE OF METADATA

(75) Inventors: Tomi Myllyla, Espoo (FI); Antti Sorvari, Itäsalmi (FI)

(73) Assignee: Nokia Corporation (FI)

( * ) Notice: Subject to any disclaimer, the term of this patent is extended or adjusted under 35 U.S.C. 154(b) by 325 days.

(21) Appl. No.: 11/428,126

(22) Filed: Jun. 30, 2006

(65) Prior Publication Data

US 2008/0005184 A1    Jan. 3, 2008

(51) Int. Cl.
    G06F 17/00    (2006.01)
(52) U.S. Cl. .................................. 707/610; 707/612
(58) Field of Classification Search .............. 707/10, 707/200–205; 709/216, 224; 340/286.02, 340/539.12; 345/1.1; 375/240.01; 386/68, 386/124; 700/90; 715/747; 725/114
    See application file for complete search history.

(56) References Cited

U.S. PATENT DOCUMENTS

| 6,345,279 | B1 * | 2/2002 | Li et al. .................. 707/104.1 |
| 6,434,520 | B1 * | 8/2002 | Kanevsky et al. ........... 704/243 |
| 2001/0042114 | A1 * | 11/2001 | Agraharam et al. ......... 709/223 |
| 2002/0023013 | A1 * | 2/2002 | Hughes et al. ............... 705/26 |
| 2002/0194612 | A1 * | 12/2002 | Lundberg et al. ........... 725/115 |
| 2003/0069877 | A1 * | 4/2003 | Grefenstette et al. .......... 707/2 |
| 2004/0139180 | A1 * | 7/2004 | White et al. ................ 709/221 |
| 2004/0230558 | A1 * | 11/2004 | Tokunaka ...................... 707/1 |
| 2005/0015713 | A1 | 1/2005 | Plastina et al. |
| 2005/0027755 | A1 | 2/2005 | Shah et al. |
| 2006/0013446 | A1 * | 1/2006 | Stephens .................... 382/115 |
| 2006/0101064 | A1 | 5/2006 | Strong et al. |
| 2006/0159109 | A1 * | 7/2006 | Lamkin et al. ............. 370/401 |
| 2006/0161635 | A1 * | 7/2006 | Lamkin et al. ............. 709/217 |

FOREIGN PATENT DOCUMENTS

| EP | 1102191 A2 | 5/2001 |
| WO | 2005109429 A1 | 11/2005 |
| WO | 2006007498 A1 | 1/2006 |

OTHER PUBLICATIONS

Jongwoo Sung et al, "UPnP based intelligent multimedia service architecture for digital home network", Apr. 27, 2006, IEEE, NY, NY, 2006 Second International Workshop for Future Embedded and Ubiquitous System, pp. 1-6.*

* cited by examiner

*Primary Examiner*—Diane Mizrahi
(74) *Attorney, Agent, or Firm*—Banner & Witcoff, Ltd.

(57) ABSTRACT

Aspects of the invention described herein provide a method and apparatus for the synchronization of metadata across various metadata repositories. According to the invention, upon synchronization of a local metadata repository and at least one remote metadata repository, metadata values are stored in a local collection or mediator database. The mediator database facilitates conflict resolution across metadata repositories. The invention further provides a repository-specific metadata memory to enable the storage of repository-specific metadata histories to further enhance management and synchronization of the metadata.

24 Claims, 9 Drawing Sheets

METHOD AND APPARATUS FOR THE SYNCHRONIZATION AND STORAGE OF METADATA

FIELD OF THE INVENTION

The invention relates to systems and methods for synchronizing and storing metadata across devices by utilizing a metadata memory and a mediator database to perform conflict resolution.

BACKGROUND OF THE INVENTION

Today, it is common to store media items such as pictures and music files on a variety of personal electronic devices. For example, many users store such information on mobile phones, Personal Digital Assistants (PDAs), laptops and desktop computers. Often it is useful to have the same files stored on multiple devices, and it is preferable that the information or metadata associated with each file is current and synchronized across all devices on which the files are stored. A user that stores, for example, an image on more than one device would like to avoid entering or updating the same image caption information on each device. Typically, metadata includes data about the media item itself, and may be automatically derived from the context of the item, such as a file type or creation date, or may be data added manually by a user. For example, an image's metadata may include the location where the image was captured, date, time, information about people in the picture, or tags added manually by the user, such as a caption or title. Conflict situations arise with such metadata when the media content stored on various devices does not change, but the metadata associated with the media content is altered in one or more of the repositories. In this scenario, different versions of metadata for the same media item can exist across repositories. Thus, it is desirable to synchronize metadata of media items located on different devices.

Various standards exist for storing metadata. Many third-party media management applications use their own internal databases to store this information. In addition, embedded metadata standards exist that provide the ability to store metadata within media files themselves, such as the IPTC (International Press Telecommunications Council) and EXIF (exchangeable image file format) standards for image files. IPTC and EXIF standards provide pre-defined fields in media file headers where different types of metadata can be stored, including, but not limited to: date, description, rating and caption.

Another emerging standard that facilitates media and metadata sharing is the Universal Plug and Play standard (UPnP). UPnP allows for different devices to interact seamlessly, and provides a foundation for handling content such as music, images, and videos in a local network. UPnP further enables such content to be accessed from various devices in a network, without regard for where the media is actually stored, and enables content and metadata transfer and/or rendering under the command of any control device in a network. UPnP devices, for example, can serve as media servers, providing storage of media content and metadata; media renderers, enabling viewing of media content; and can provide control point functionality, controlling the media interaction between servers and renderers.

One important element of a media server is the Content Directory Service (CDS). CDS acts as a database to store the metadata of content so that the content can be easily queried and browsed from various control points in the network. CDS implements tree-like structures to support various types of content (music, images, videos, albums, playlists) with all the nodes providing their own metadata fields to describe the item. For images, this metadata includes the same kind of data about media items that IPTC and EXIF metadata contains, and also many UPnP specific fields and vendor extendable fields. Applications implementing UPnP control point functionality may access CDS located anywhere in home network.

The synchronization of this kind of metadata, however, is difficult because replicas of metadata may exist in multiple devices and/or repositories. Metadata may be altered in one repository independently of all other repositories on which it resides, making the time relation of the changes hard to determine during an attempted synchronization. Determining the time relation of changes in metadata fields would require metadata about metadata, namely, timestamps telling when changes to metadata were made. This requires additional storage space to hold the second set of metadata on each device, in order to make it available for use during synchronization. To implement such a solution, it is also required that each individual device, regardless of platform, have application logic to allow it to capture and store the additional metadata information—which is often an unattainable requirement.

There is a need in the art for a system and method which can reduce storage requirements and application/logic requirements on the individual devices themselves and, at the same time, enable metadata changes to be propagated correctly from one device to another to ensure that each device contains the most current metadata information about its media files. There is further a need to implement a metadata memory management system for streamlining conflict resolution during synchronization.

SUMMARY OF THE INVENTION

Aspects of the present invention provide an algorithm to synchronize metadata and handle conflict resolution for metadata repositories. Embodiments, wherein changes made to metadata in one or more devices are analyzed, provide a method for resolving conflicts during synchronization, without having timestamp information.

In one embodiment of the invention, an application providing synchronization logic is housed on a single "home" device, which acts as a controller of the synchronization process and queries other metadata repositories on the local device, or remote device or service. A collection, such as a mediator database is stored in the "home" device to hold information gathered from the latest synchronization with other repositories. Aspects of the invention can then provide conflict resolution by simple repository-dependent metadata versioning. In this embodiment, the invention is not dependent on increased logic in each remote device in order to perform the synchronization. The aspects of this embodiment require additional storage only on the "home" device, where the mediator database retains replicas of the values captured at the last synchronization with each repository, instead of requiring each remote device to maintain a timestamp for changes to metadata values.

Another embodiment of the invention provides a repository-specific metadata memory to store an entire repository-specific metadata history on a local device. A full metadata memory enables queries of previous metadata values from a full metadata history.

BRIEF DESCRIPTION OF THE DRAWINGS

The present invention is illustrated by way of example in the following figures and is not limited by the accompanying figures in which.

DETAILED DESCRIPTION OF THE INVENTION

Metadata Synchronization

Figure 1:
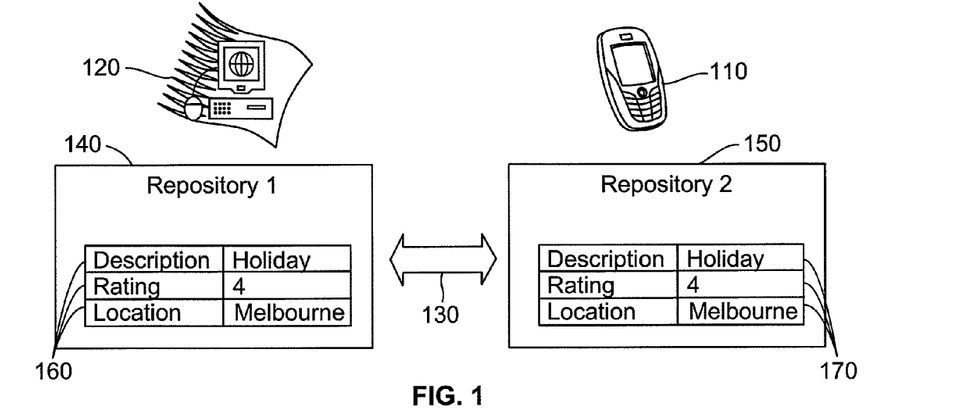
FIG. 1 depicts a general metadata synchronization situation, composed of two devices, a computer workstation and a mobile phone, communicating with each other according to one embodiment of the present invention.

FIG. 1 is a simplified exemplary system showing the communication 130 that can occur between two devices to be synchronized, 110 and 120. Each device has at least one database (repository) 140/150 for storing metadata values 160/170 associated with files held on that device. For example, the metadata values 160 and 170 of FIG. 1 might refer to pictures taken during a holiday in Melbourne.

Figure 2:
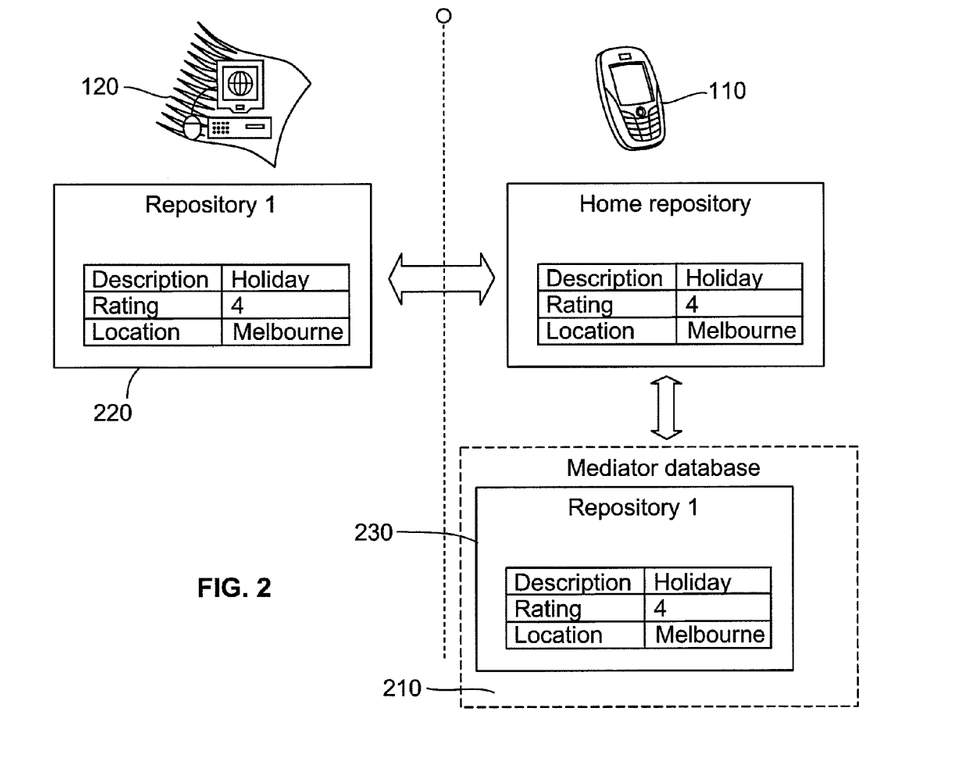
FIG. 2 further depicts a general metadata synchronization situation, composed of two devices, a computer workstation and a mobile phone, communicating with each other according to one embodiment of the present invention, and further communicating with a synchronization database.

According to one embodiment of the present invention, a local device controls the synchronization between a metadata repository in a local device and other remote metadata repositories that may be stored either to a local device, or to a remote device or service. The synchronization is facilitated by an external database or collection called a mediator database. The mediator database may be attached to a local repository, called the home repository. The home repository, therefore, acts as one end of synchronization. The mediator database contains metadata replicas for all devices and repositories where metadata has been synchronized, so it contains at least as many tables as there are external repositories where metadata has been synchronized. FIG. 2 depicts the same two devices of FIG. 1 with the remote repository metadata 220 saved in a mediator database 210 to facilitate synchronization.

According to aspects of the invention as described further below, the mediator database facilitates conflict resolution, but need not contain any extra information related to synchronization, such as timestamps. The database is able to settle conflicts and determine timely relations between conflicting metadata fields just by simple repository-dependent metadata versioning.

Figure 3:
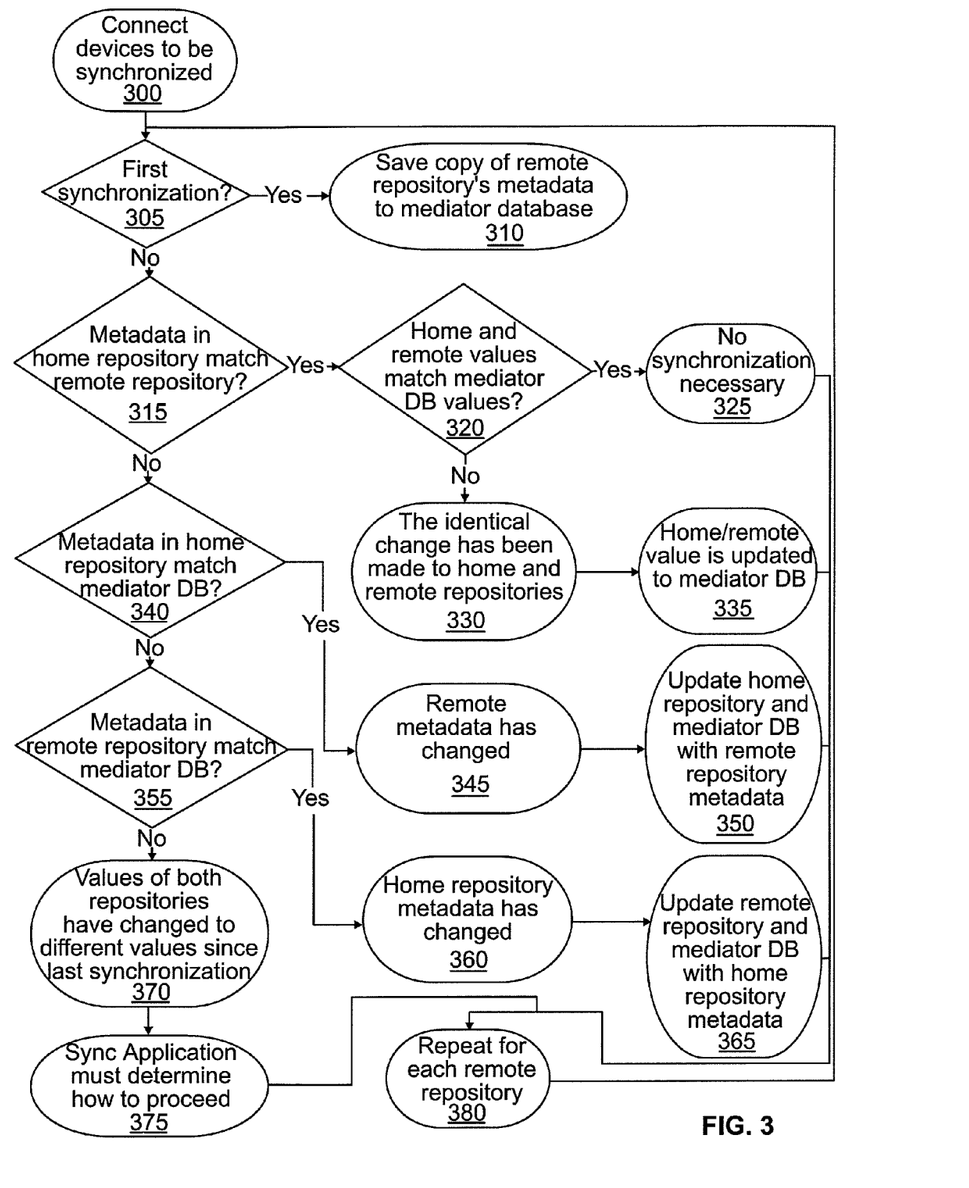
FIG. 3 is a flowchart depicting an embodiment of the metadata synchronization process according to the present invention.

FIG. 3 depicts a flowchart illustrating steps that can be performed to practice embodiments of the present invention. In step 300, two or more devices are connected to be synchronized. In step 305 a check is made to determine whether this is the first synchronization between the devices. If the metadata of two repositories (home repository where the mediator database is attached and one remote repository) are synchronized for the first time, such that one of the two repositories is initially empty and no conflict resolution situations appear, then in step 310 an exact copy of synchronized metadata is saved to the mediator database on a table representing the destination repository (for example, this may be a unique ID of the remote repository, or ID representing IPTC metadata of locally stored media files). According to the invention described herein, the data that is synchronized and saved to the database consists of the actual metadata values rather than timestamp information indicating when metadata was altered.

If in step 305, it is determined that this is a repeat synchronization between the two devices, changes to metadata may have been made in either repository. Therefore, in step 315, the mediator database is used to settle possible metadata conflicts of metadata fields by checking to determine whether the metadata values in the home repository match those in the remote repository. If so, a check is made in step 320 to determine if the remote metadata match the corresponding values in the mediator database. If there is a match, no synchronization is necessary in step 325, because no change to metadata in either repository has taken place.

However, if the home/remote metadata values do not match the mediator database but the values match each other, it can be concluded in step 330 that the identical change has been made in the home and remote repositories. In step 335 this value is updated to the mediator database, but values in the home and remote repositories remain the same.

Figure 4:
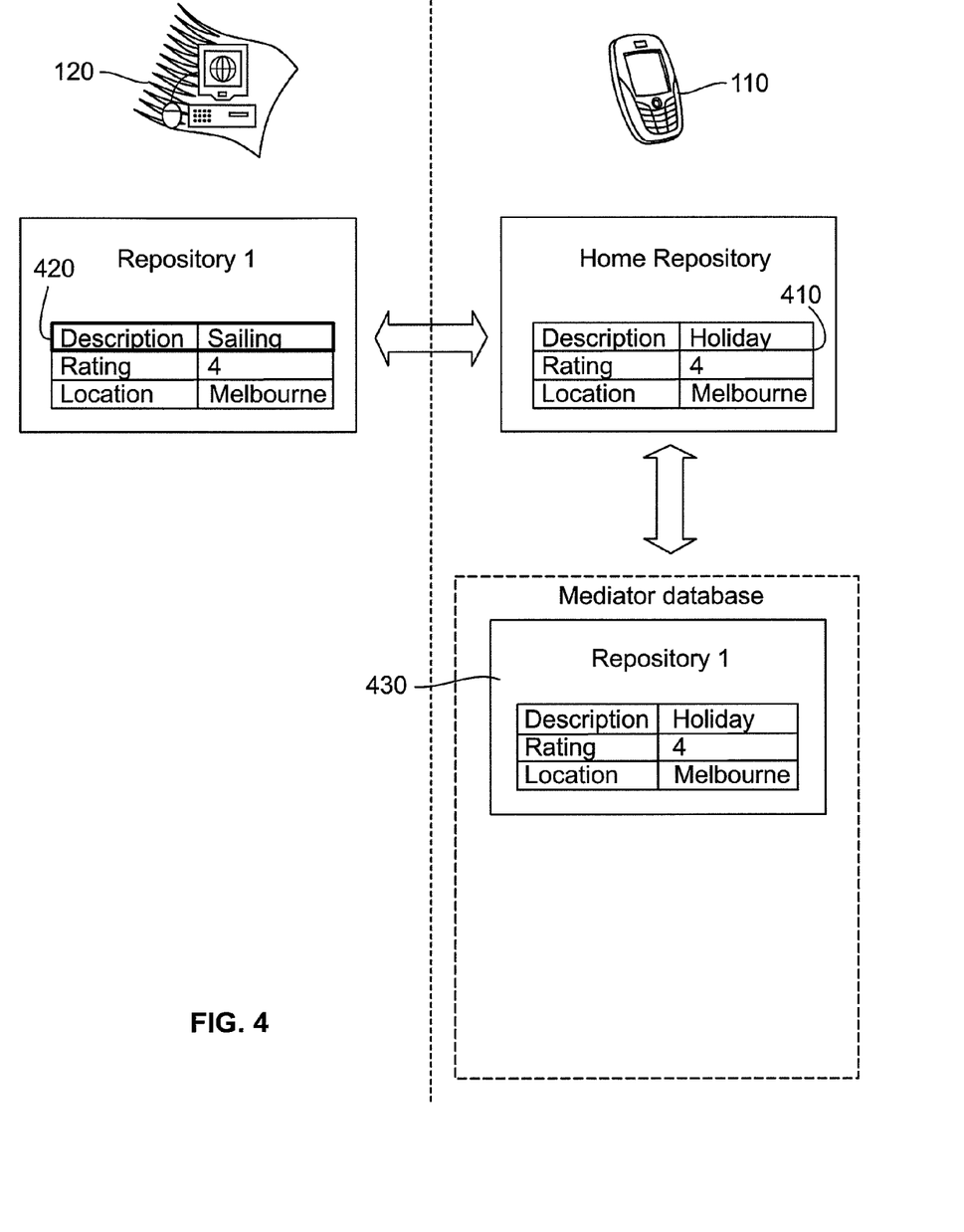
FIG. 4 depicts an exemplary metadata conflict situation, between a workstation and mobile phone, before synchronization takes place, in accordance with one embodiment of the present invention.
Figure 5:
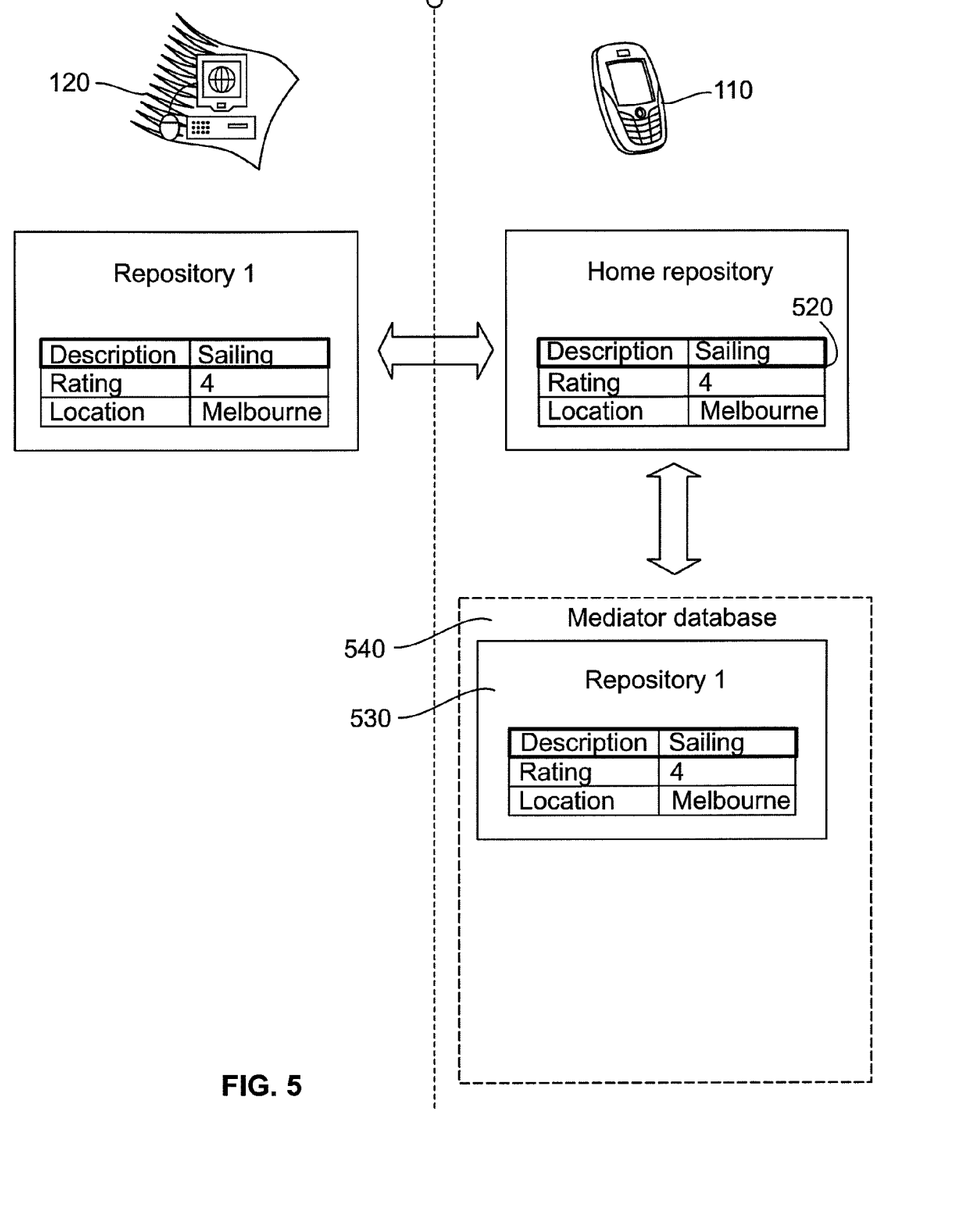
FIG. 5 depicts the result after synchronization of the system depicted in FIG. 4, in accordance with one embodiment of the present invention.

Using FIG. 4 as an example, if values in the home repository 410 do not match those in the remote repository 420 as determined in step 315, then a check is performed in step 340 to determine if metadata in the home repository 410 match the mediator database 430. If the home repository values 410 match the mediator values 430, it can be concluded, in step 345, that the value in the remote repository 420 has changed. Therefore, to synchronize this discrepancy (see FIG. 5), this value is propagated, in step 350, to the home repository 520 and also to the corresponding location in the mediator database 530 within the table representing the remote repository 540.

If, instead, the check in step 340 determines that values in the home repository do not match the mediator database, then in step 355 another check is made to determine if the values in the remote repository match the mediator database. If so, it can be concluded, in step 360, that the metadata element in the home repository has changed. This value is updated, in step 365, in the remote repository and also in the mediator database in the table representing the remote repository.

If the check in step 355 reveals that the metadata values of the remote repository and mediator database do not match, after determining that values of the home repository and mediator database do not match, it can be concluded, in step 370, that values in both repositories have changed since the last synchronization. It is then the responsibility of the synchronization application, in step 375, to determine how to proceed in this situation.

Once the first synchronization is completed in step 380, the process can, if necessary, return to step 305 and repeat to synchronize any additional devices.

Many different embodiments of the invention are possible. In another embodiment, metadata values may exist in the home repository but the corresponding fields in the mediator database and remote repository are empty, in which case it can be concluded that a piece of metadata has been added to the home repository since the last synchronization. In this embodiment of the invention, the new data should be propagated to the remote repository and also added to the mediator database on the table representing the remote repository. The invention can also be applied to an empty field in the other direction: determining metadata additions which were made in the remote repository and also determining additions made in both repositories.

Another aspect of the invention allows for deletion of metadata. If the metadata value in the home repository is nonexistent (the field is empty) but some value exists in the mediator database on the table representing that remote repository, and the value in the mediator database also matches the value in the remote repository, it can be concluded that the piece of metadata has been deleted from the home repository. The deletion is then propagated to the remote repository, and the mediator database field, corresponding to the remote repository, is emptied. The abovementioned algorithm can also be applied in the other direction, for example, determining metadata deletions made in the remote repository, both repositories, or a deletion made in any other repository and other kind of metadata value modification made in the any other repository.

In a related aspect of the invention, when new metadata is synchronized from any remote repository to the local repository (the mediator database determines that the remote repository contains a newer value), a test can be conducted to determine whether the same piece of metadata exists in a table representing any other metadata repositories in the mediator database (tables representing a remote repository aside from the one in question). If it exists, it can be concluded that the metadata has already appeared in the home repository at some prior time, and it must be determined by the synchronization application or end-user whether to synchronize this metadata back to the local repository.

In another embodiment of the invention, more than two devices are connected to each other to be synchronized. In such an embodiment, the synchronization process is conducted by comparing one pair at a time (each remote repository is synchronized with the home repository) and proceeding in such a manner serially through all device pairs. The home repository would always act as one element of the pair to be synchronized, and in this manner any number of devices may be synchronized together using this invention.

Another embodiment of the invention provides a method to leverage universal standards, such as EXIF and IPTC, which maintain metadata without timestamp information. In this way the invention can be used to synchronize IPTC metadata with a CDS repository in the same device or in remote devices. Using the invention to resolve conflicts, changes can be correctly propagated among devices utilizing these metadata standards, without timestamp information. While certain metadata standards have been mentioned, it should be understood by those in the art that any repository capable of storing field-based metadata can be utilized with this invention.

Figure 6:
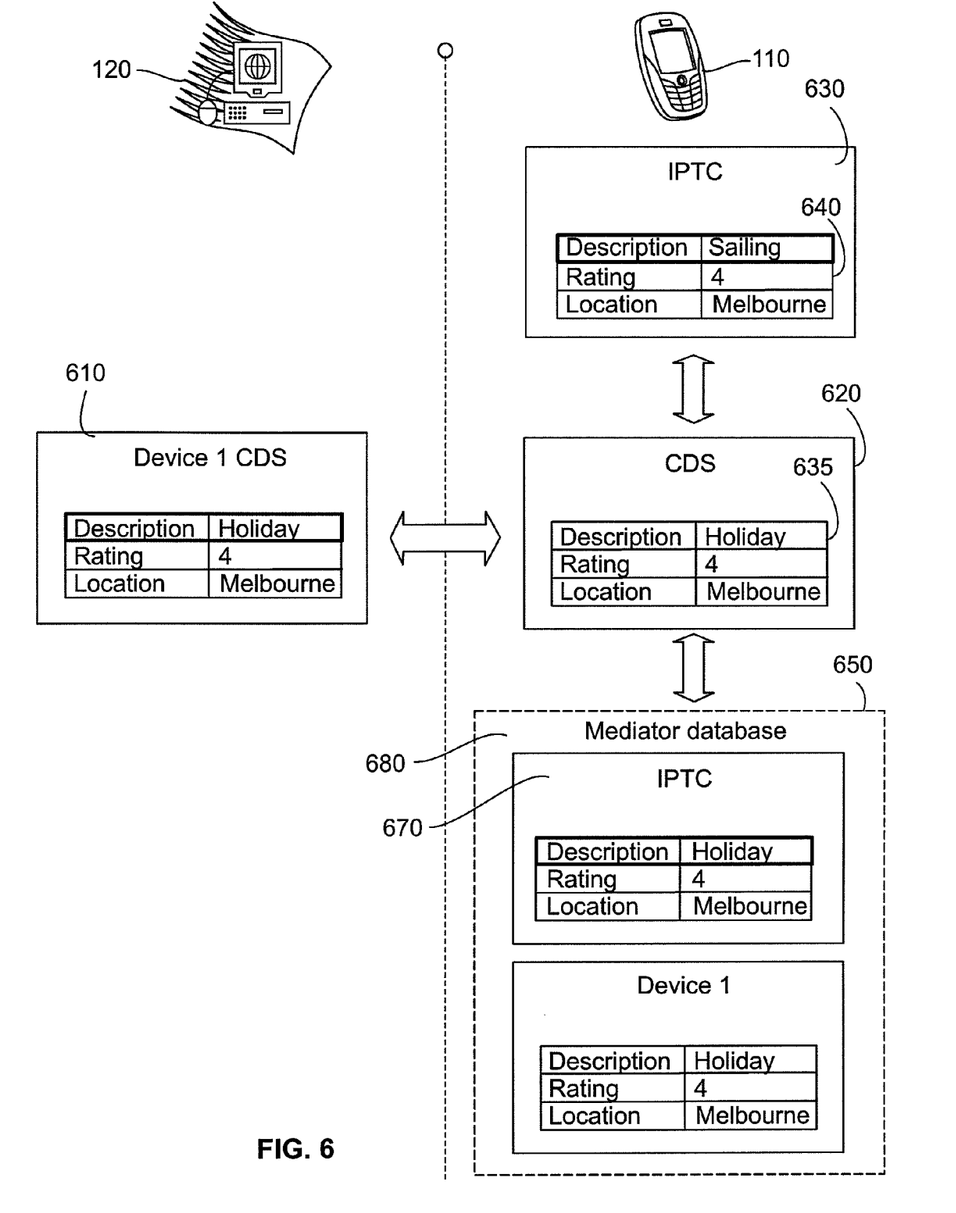
FIG. 6 depicts another exemplary metadata conflict situation, between a workstation, a mobile phone's IPTC data and the mobile phone's CDS database, before synchronization takes place, in accordance with one embodiment of the present invention.
Figure 7:
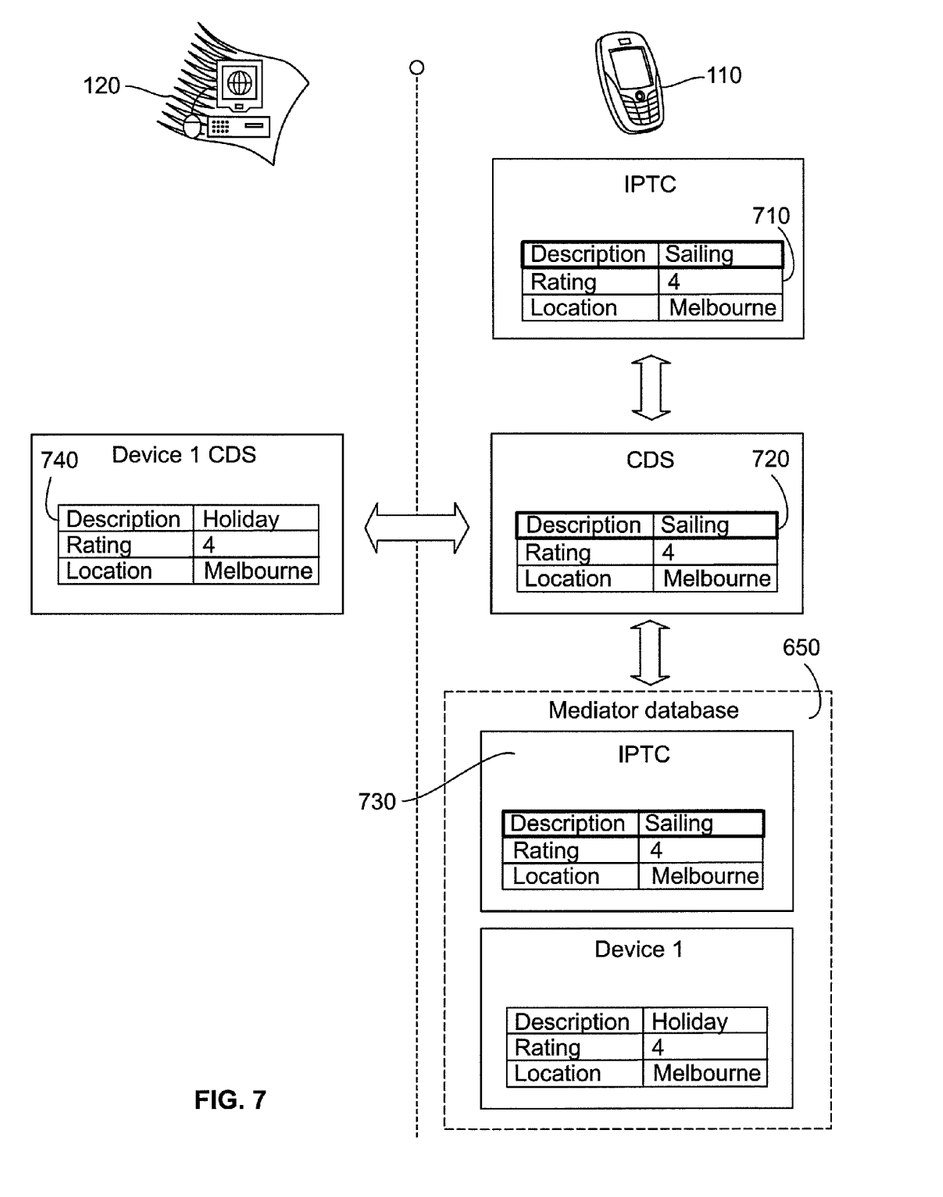
FIG. 7 depicts an intermediate result, after partial synchronization of the system depicted in FIG. 6, in accordance with one embodiment of the present invention.

Another embodiment of the invention contemplated provides a method to synchronize multiple devices, including two or more repositories on the same device such, as exists in the following setup (exemplified by FIG. 6): two Universal Plug and Play (UPNP) media servers maintaining Content Directory Services, 610 and 620, and a locally stored IPTC metadata repository 630. When the IPTC metadata value 640 is modified with an external media management application, such as Nokia Album, a conflict situation appears between the three metadata repositories (610, 620 and 630). In this embodiment of the invention, the mediator database 650 solves the conflict between the three metadata repositories (610, 620 and 630) in the following way: the home repository value 635 and IPTC 640 are determined to be conflicting in the local device 660. The metadata information for the conflicting field 670 is queried from the mediator database's table 680 which corresponds to IPTC. Since the mediator database value 670 matches the value in home repository 635 but does not match to the IPTC value 640, it can be determined that the IPTC value 640 has changed. For conflict resolution, exemplified by FIG. 7, the new value 710 is updated to the home repository 720 and mediator database value corresponding to the IPTC repository 730. The final step in this embodiment would be to synchronize the remote repository value 740, existing on a remote device 120, to the recently updated home value 720, by using the algorithm described above under the first embodiment of the invention.

Figure 8:
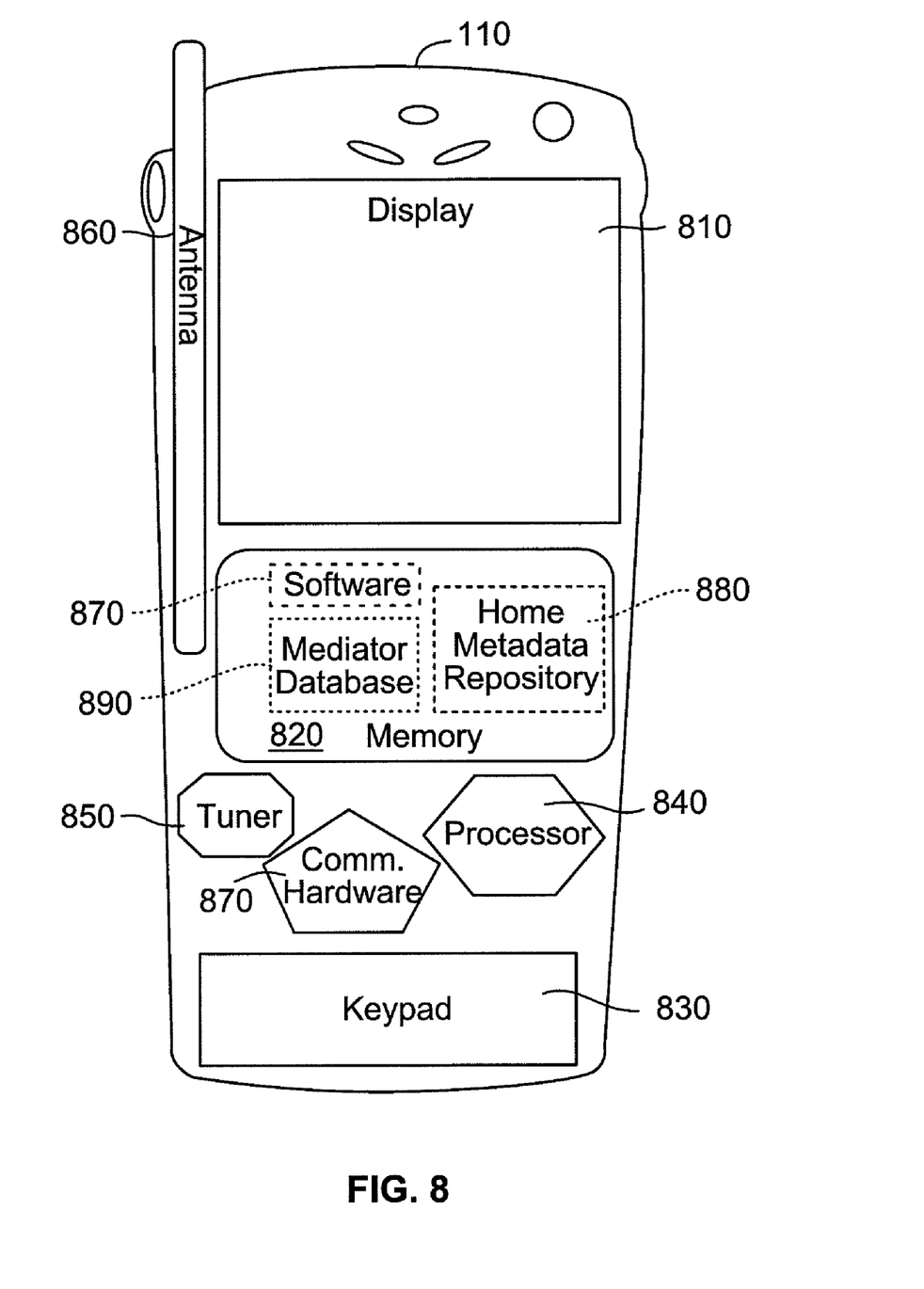
FIG. 8 depicts an exemplary media device according to one embodiment of the present invention.

As shown in the figures, a media device 110 may be in communication with a remote device 120, such as a remote computer. The media device 110 may be a mobile network-enabled device, such as a personal digital assistant (PDA), cellular telephone, mobile terminal, personal video recorder, portable television, personal computer, digital camera, digital camcorder, portable audio device, portable radio, or combinations thereof. The media device 110 generally includes any device capable of storing media and associated metadata and interacting with other such devices. The metadata may be formatted in accordance with an XML schema FIG. 8 depicts an example media device 110 pursuant to the present invention. Media device 110 may include a display screen 810, memory 820, a keypad 830, a processor 840, a tuner 850, an antenna 860, and communication hardware 870. As is known in the art, the processor 840 performs steps according to instructions stored in the memory 820 and generally interacts with other components of the media device 110. The display screen 810 displays images and the keypad 830 is adapted to receive inputs from an operator.

The memory 820 may be implemented with any combination of read only memory modules or random access memory modules, optionally including both volatile and nonvolatile memory. Software 870 may be stored within memory 820 to provide instructions to processor 840 for enabling mobile device 110 to perform mediation and synchronization functions as described herein. Alternatively, some or all of mobile device 110 computer executable instructions may be embodied in external hardware or firmware (not shown) according to embodiments known in the art. In addition, a home metadata repository or content directory service 880 and a mediator database 890 as described herein may be stored in memory 820. Alternatively, both the home metadata repository, content directory service, and mediator database may be embodied in external hardware or firmware (not shown) according to embodiments known in the art. The device of the present invention, however, is not limited to any particular embodiment of a device, provided the device has data connectivity, transmission, and broadcast reception capabilities.

Further, the device 110 of present invention is not limited to any particular embodiment for enabling data connectivity or broadcast reception. For example, the media device 110 may use a circuit switched connection for data connectivity, such as a second-generation wireless system using TDMA (Time Division Multiple Access), CDMA (Code Division Multiple Access), GSM (Global System for Mobile Communications), UMTS/3G, WCDMA or other such access systems. In other examples, the media device 110 may use a packet based access system, such as GPRS (General Packet Radio Service) over a GSM network, or short range connectivity systems such as WLANs (Wireless local area networks) or BLUETOOTH.

Figure 9:
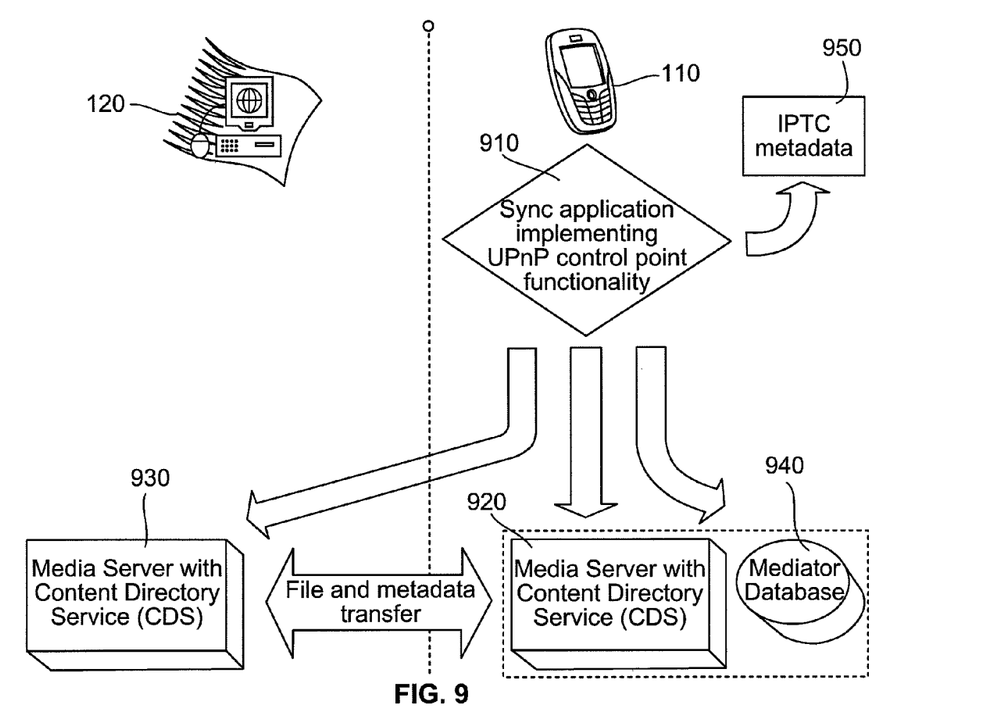
FIG. 9 depicts the synchronization of metadata between a workstation and a mobile phone by use of a synchronization application, according to one embodiment of the present invention.

Alternative embodiments have been described in detail, but it should be understood that the invention is not limited to those embodiments described herein. For example, another embodiment of the invention contemplates synchronizing a local metadata repository with remote content and metadata stores that are accessible to the controller device through HTTP based protocols and services. A further embodiment of the invention, specifically using UPnP, includes synchronizing media server Content Directory Services of local and remote devices, synchronizing local Content Directory Service with IPTC metadata of locally stored media files, and also synchronizing local Content Directory Service with an external media management application database that is maintained in the same device. The synchronization application implements UPnP control point functionality and is able to access metadata in local and remote media server Content Directories, interact with local mediator database, access locally stored media files to obtain and modify embedded IPTC metadata, and also interact with locally stored external media management application metadata databases. FIG. 9 depicts a mediator database implementation controlled by a separate synchronization application 910. In the embodiment of FIG. 9, two media server Content Directories 920 and 930 and a local IPTC metadata repository 950 are synchronized to the mediator database 940.

Metadata Memory

It is further contemplated that, in addition to, or in lieu of, only storing updated metadata values after synchronization, a repository-specific metadata memory may store an entire repository-specific metadata history on a local device, to enable queries of previous metadata values from a full metadata history. Specifically, the metadata memory allows for enhanced metadata gathering and management. While conflict resolution may still be utilized with the use of a metadata memory, it is possible to avoid conflict resolution situations by allowing concurrent versions of metadata for the same media item to exist at the same time, and to allow the user to utilize a subset of the stored metadata through repository-specific metadata views, or to manually resolve metadata conflicts.

Figure 10:
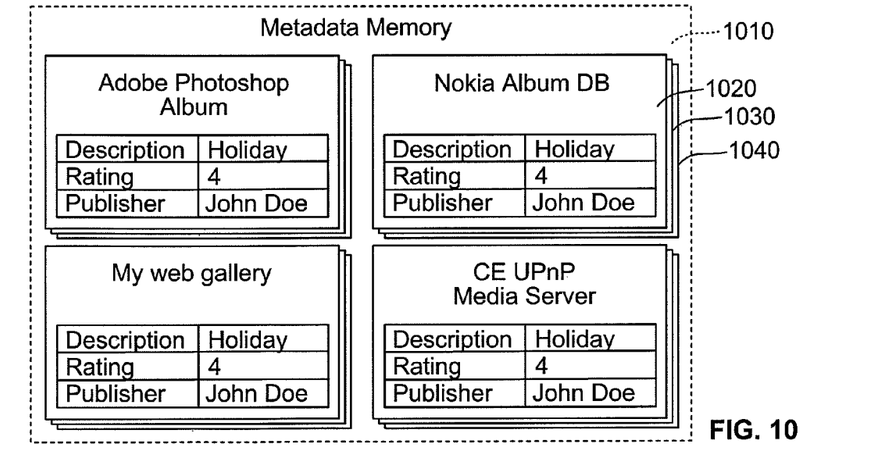
FIG. 10 depicts an exemplary metadata database according to one embodiment of the present invention.

FIG. 10 depicts the concept of a metadata memory 1010 according to further aspects of the present invention. Metadata memory 1010 is a database stored to a local device that has access to local metadata repositories and also metadata in remote repositories. The metadata memory includes all metadata including metadata histories 1020, 1030 and 1040 from metadata repositories that a local device has interacted with.

The metadata memory of the present invention maintains specific database tables for all metadata repositories a user has defined it to interact with, and the tables contain both the current and historic metadata of the repositories. The metadata memory may contain metadata of both the local repositories (for example, phone repositories including metadata of external media management applications, IPTC etc.) and remote repositories (for example, user-specified metadata repositories in other devices that can be accessed from the local device, including UPnP Media Server Content Directory Services, etc.). The metadata memory can be updated automatically when a local device interacts with remote devices, and metadata updates from local metadata repositories can be obtained periodically. Generally, if metadata has changed in any monitored metadata repositories, metadata is obtained and added to metadata memory in the repository table on top of previous metadata values so that all the previous values are also preserved. A separate synchronization application can interact with the metadata memory to determine whether certain values of metadata have previously existed in a specific repository or device. Among other things, the ability to preserve historic metadata information allows a synchronization application to make more intelligent decisions, such as to not update the same metadata values more than once to the same repository or device. It also allows for the location of old metadata for content. For example, a user may be trying to locate a media item and can only remember a previous category of the media item. By knowing this information, the history of the media item can be traced and old metadata values can be restored by use of the metadata history.

In one embodiment of the metadata memory, a synchronization application is used to query metadata of local and remote repositories that the user has defined to monitor. Local repositories may be monitored automatically and periodically or based on change notifications, and remote repositories may be monitored when they are available for the synchronization application to access. When metadata values are obtained, if the metadata values in the monitored repository and the corresponding repository table in local metadata memory are equal, no new metadata versions are added to the metadata memory. However, if metadata values differ in the monitored repository and the corresponding repository table in local metadata memory, a new version of metadata is added to the metadata memory on top of the previous metadata values. In order to save memory, this new version may only contain the changed metadata field.

When metadata memory database values are updated during synchronization it is also possible to retain the origin of the metadata. Thus, when the synchronization application is updating values to the metadata memory, the metadata memory may be queried to determine if the same metadata value already exists in any table of the metadata memory (including metadata histories). If it doesn't it can be concluded that the specific metadata value originates from the repository where it was received, and a new field can be added to the metadata item identifying the originating metadata repository. The value is also stored to metadata memory.

Aspects of the invention also allows for metadata of content, such as a thumbnail copy of an image, to be stored to the metadata memory from repositories maintained in devices other than the local device. For instance, it may not be desirable to store all of the content in a local device (due to the lack of memory perhaps). In such a case, the synchronization application may still obtain the metadata when interacting with different devices and store it to metadata memory with linkage to store where the actual content lies. In this embodiment, a user can still leverage the metadata and actual content can be obtained when necessary, or at least information can be provided where the actual content is stored.

Aspects of the metadata memory described herein also allow for enhanced synchronization functionality. Specifically, through use of the metadata memory a user can set metadata override policies to solve metadata conflict situations between repositories, instead of relying solely on a mediator such as the mediator database described herein. Because the metadata memory can also store information about the origination of the metadata, i.e. the originating repository of the metadata, priorities can be set between metadata repositories. Thus, if a remote metadata repository contains new data, it does not need to be updated to a home repository before updating to other remote repositories. Specifically, with the use of metadata memory, updating new metadata to other repositories can be controlled by synchronization policies set by a user. Since metadata exists in metadata memory it can always be updated to other repositories by synchronization application if necessary, and priority lists can be set between any repositories. In addition, a user may also restrict the updating of metadata in selected repositories.

Other embodiments of the metadata memory described herein allow for enhanced synchronization of metadata repositories. According to the present invention, where metadata values in both ends have changed between synchronizations, a metadata value may be preferred that has not previously existed in the according metadata repository. Another example of enhanced synchronization is to not perform conflict resolution between metadata repositories, but instead to save all new values from different metadata repositories to metadata memory. In such a case, it could be the responsibility of an external applications to leverage the metadata in metadata memory repository-specific tables. Yet another example of enhanced synchronization could be achieved using user-guided conflict resolution. Because the metadata memory contains all metadata, a user could decide which metadata is appropriate on a per-case basis. Furthermore, since metadata is not deleted, any decision—even a wrong decision—would be reversible.

Other aspects of the present invention allow for queries to be made to construct repository-specific views of metadata, such as where metadata is shown according to the repository where it has been received or where it originated. For example, with a history or all metadata values, queries such as "find all metadata received originally from a certain repository," or "find the recent metadata values in a certain repository." With added functionality such as this, values can be added to media management products by providing alternative metadata organization themes, represented by metadata of different repositories, maintained in different devices, by different users. For example, a Nokia Album media management application in a mobile phone could be leveraged by showing only the metadata view of third-party media management application in a computer, or showing metadata values received from certain mobile device(s) during mobile sharing of media items. In addition, a user may rename or delete repository-specific tags so that changes are only leveraged in the according context or metadata view. Importing the values to "default" metadata view may also be supported, as well as synchronizing these changes back to source metadata repository in certain device. As another example, a user could utilize content popularity information from various devices so that instead of seeing a list of music, ordered based on the listening frequency on the user's phone, for example, the user could switch to a view where the user would see the list of music ordered based on the listening frequency on home stereos or on a friend's phone.

Figure 11:
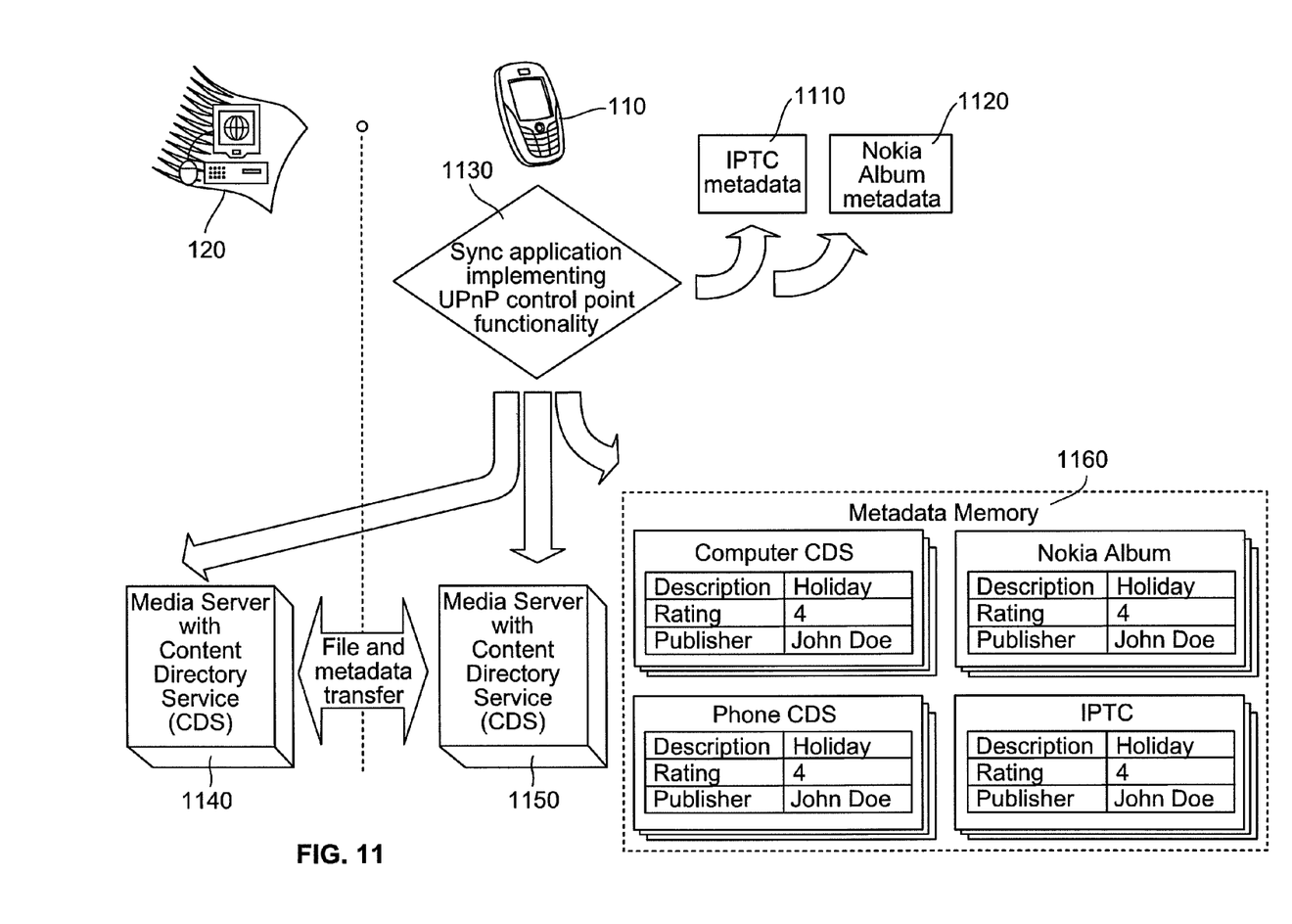
FIG. 11 depicts the synchronization of metadata between a workstation and a mobile phone by use of a synchronization application and a metadata memory database, according to one embodiment of the present invention.

FIG. 11 presents a synchronization situation implementing a metadata memory in a UPNP environment, according to an embodiment of the present invention. In FIG. 11, there is a separate synchronization application 1130 synchronizing between mobile device 110 and workstation 120. In the embodiment of FIG. 1, the metadata of two media server Content Directories 1140 and 1150, a local IPTC metadata repository 1110, and a local Nokia album 1120 are synchronized and/or saved to the metadata memory 1160.

The mediator database and metadata memory described herein may be separate databases that can exist in a device concurrently, or the mediator database functionality may be included in the metadata memory database.

While the invention has been described herein with respect to specific examples, including presently preferred modes of carrying out the invention, those skilled in the art will appreciate that there are numerous variations and permutations of the above described systems and techniques that fall within the spirit and scope of the invention as set forth in the appended claims.

We claim:

1. A method comprising:
   accessing metadata fields of at least one specific remote metadata repository;
   saving replicas of the metadata fields of the at least one specific remote metadata repository in a collection table attached to the home metadata repository, said replicas of the metadata fields being gathered in at least one previous synchronization between the home metadata repository and the at least one specific remote metadata repository;
   comparing, by a processor, data in the metadata fields of the home metadata repository to data in the metadata fields of the at least one specific remote metadata repository to identify inconsistent data in the metadata fields;
   comparing, by the processor, data in the metadata fields of at least one of the home metadata repository and the at least one specific remote metadata repository to data in the metadata fields of the collection table to determine change, made to at least one of the home metadata repository and the at least one specific remote metadata repository, with respect to said at least one previous synchronization between the home metadata repository and the at least one specific remote metadata repository; and
   updating, by the processor, the metadata fields of one or more of the home metadata repository, the at least one specific remote metadata repository and the collection table based at least in part on determined change, made to at least one of the home metadata repository and the at least one specific remote metadata repository, with respect to said at least one previous synchronization between the home metadata repository and the at least one specific remote metadata repository.

2. The method of claim 1, wherein said updating comprises:
   updating the data in the metadata fields of the home metadata repository and the data in the metadata fields of the collection table to be consistent with the data in the metadata fields of the at least one specific remote metadata repository when change, with respect to said at least one previous synchronization, is determined to be made to the data in the metadata fields of the at least one specific remote repository.

3. The method of claim 1, wherein said updating comprises:
updating the data in the metadata fields of the at least one specific remote metadata repository and the data in the metadata fields of the collection table to be consistent with the data in the metadata fields of the home metadata repository.

4. The method of claim 1, wherein said updating comprises:
updating the data in the metadata fields of the collection table to be consistent with the data in the metadata fields of the home metadata repository and the data in the metadata fields of the at least one specific remote metadata repository when change, with respect to said at least one previous synchronization, is determined to be made to the data in the metadata fields of the home metadata repository and to data in the metadata fields of the at least one specific remote metadata repository.

5. The method of claim 1, wherein said updating comprises:
saving at least one metadata field, determined to be added in the home repository with respect to said at least one previous synchronization, to the metadata fields of the at least one specific remote metadata repository and to the metadata fields of the collection table.

6. The method of claim 1, wherein said updating comprises:
deleting at least one metadata field, determined to be deleted from the home metadata repository with respect to said at least one previous synchronization, from the at least one specific remote metadata repository and from the at least one metadata field of the collection table.

7. The method of claim 1, wherein the data in the metadata fields of the home metadata repository, the at least one specific remote metadata repository and the collection tables is international press telecommunications council metadata.

8. The method of claim 1, wherein the data in the metadata fields of the home metadata repository, the at least one specific remote metadata repository and the collection tables for the remote metadata repositories is exchangeable image file metadata.

9. The method of claim 1, wherein the home metadata repository is a content directory service.

10. The method of claim 1, wherein the at least one specific remote metadata repository is a content directory service.

11. An apparatus comprising:
a storage medium containing a home metadata repository and a mediator database associated with at least one remote metadata repository;
a processor; and
at least one memory including computer program code, the at least one memory and the computer program code configured to, with the processor, cause the apparatus at least to perform:
access metadata fields of the at least one remote metadata repository for synchronization with metadata fields of a home metadata repository;
save, within the mediator database, replicas of the metadata fields of the at least one remote metadata repository in a collection table, said replicas of the metadata fields being gathered in at least one previous synchronization between the home metadata repository and the at least one remote metadata repository;
compare data in the metadata fields of the home metadata repository to data in the metadata fields of the at least one remote metadata repository to identify inconsistent data in the metadata fields;
compare data in the metadata fields of at least one of the home metadata repository and the at least one remote metadata repository to data in the metadata fields of the collection table to determine change, made to at least one of the home metadata repository and the at least one remote metadata repository, with respect to said at least one previous synchronization between the home metadata repository and the at least one remote metadata repository; and
update the metadata fields of one or more of the home metadata repository, the at least one specific remote metadata repository and the collection table based at least in part on determined change, made to at least one of the home metadata repository and the at least one remote metadata repository, with respect to said at least one previous synchronization between the home metadata repository and the at least one remote metadata repository.

12. The apparatus of claim 11, wherein the at least one memory and the computer program code configured to, with the processor, further cause the apparatus to perform:
update the data in the metadata fields of the home metadata repository and the data in the metadata fields of the collection table to be consistent with the data in the metadata fields of the remote metadata repository, when change, with respect to said at least one previous synchronization, is determined to be made to the data in the metadata fields of the at least one remote repository.

13. The apparatus of claim 11, wherein the at least one memory and the computer program code configured to, with the processor, further cause the apparatus to perform:
update the data in the metadata fields of the remote metadata repository and the data in the metadata fields of the collection table to be consistent with the data in the metadata fields of the home metadata repository when change, with respect to said at least one previous synchronization, is determined to be made to the data in the metadata fields of the home metadata repository.

14. The apparatus of claim 11, wherein the at least one memory and the computer program code configured to, with the processor, further cause the apparatus to perform:
update the data in the metadata fields of the collection table to be consistent with the data in the metadata fields of the home metadata repository and the data in the metadata fields of the at least one remote metadata repository when change, with respect to said at least one previous synchronization, is determined to be made to the data in the metadata fields of the home metadata repository and to the data in the metadata fields of the at least one remote metadata repository.

15. The apparatus of claim 11, wherein the at least one memory and the computer program code configured to, with the processor, further cause the apparatus to perform:
saving at least one metadata field, determined to be added in the home repository with respect to said at least one previous synchronization, to the metadata fields of the at least one remote metadata repository and to the collection table.

16. The apparatus of claim 11, the at least one memory and the computer program code configured to, with the processor, further cause the apparatus to perform:
deleting at least one metadata field, determined to be deleted from the home metadata repository with respect to said at least one previous synchronization, from the at least one remote metadata repository and from the collection table.

17. An apparatus comprising:
- means for storing a home metadata repository and a mediator database, said mediator database being associated with at least one remote metadata repository;
- means for accessing metadata fields of at least one remote metadata repository for synchronization with metadata fields of a home metadata repository;
- means for saving, within the mediator database, replicas of the metadata fields of the at least one remote metadata repository in a collection table, said replicas of the metadata fields being gathered in at least one previous synchronization between the home metadata repository and the at least one remote metadata repository;
- means for comparing data in the metadata fields of the home metadata repository, to data in the metadata fields of the at least one remote metadata repository to identify inconsistent data in the metadata fields;
- means for comparing data in the metadata fields of at least one of the home metadata repository and the at least one remote metadata repository to data in the metadata fields of the collection table to determine change, made to at least one of the home metadata repository and the at least one remote metadata repository, with respect to said at least one previous synchronization between the home metadata repository and the at least one remote metadata repository; and
- means for updating the metadata fields of at least one of the home metadata repository, the at least one remote metadata repository and the collection tables based at least in part on determined change, made to at least one of the home metadata repository and the at least one remote metadata repository, with respect to said at least one previous synchronization between the home metadata repository and the at least one remote metadata repository.

18. The apparatus of claim 17, wherein the means for comparing data comprises a memory, a processor, computer executable instructions and communication hardware.

19. A computer-readable medium storing computer-executable instructions that, when executed, cause an apparatus to perform:
- accessing metadata fields of at least one specific remote metadata repository;
- saving replicas of the metadata fields of the at least one specific remote metadata repository in a collection table attached to the home metadata repository, said replicas of the metadata fields being gathered in at least one previous synchronization between the home metadata repository and the at least one specific remote metadata repository;
- comparing data in the metadata fields of the home metadata repository to data in the metadata fields of the at least one specific remote metadata repository to identify inconsistent data in the metadata fields;
- comparing data in the metadata fields of at least one of the home metadata repository and the at least one specific remote metadata repository to data in the metadata fields of the collection table to determine change, made to at least one of the home metadata repository and the at least one specific remote metadata repository, with respect to said at least one previous synchronization between the home metadata repository and the at least one specific remote metadata repository; and
- updating the metadata fields of one or more of the home metadata repository, the at least one specific remote metadata repository and the collection table based at least in part on determined change, made to at least one of the home metadata repository and the at least one specific remote metadata repository, with respect to said at least one previous synchronization between the home metadata repository and the at least one specific remote metadata repository.

20. The computer readable medium of claim 19, wherein the instructions further the apparatus to perform:
- updating the data in the metadata fields of the home metadata repository and the data in the metadata fields of the collection table to be consistent with the data in the metadata fields of the at least one specific remote metadata repository when change, with respect to said at least one previous synchronization, is determined to be made to the data in the metadata fields of the at least one specific remote repository.

21. The computer readable medium of claim 19, wherein the instructions further the apparatus to perform:
- updating the data in the metadata fields of the at least one specific remote metadata repository and the data in the metadata fields of the collection table to be consistent with the data in the metadata fields of the home metadata repository.

22. The computer readable medium of claim 19, wherein the instructions further the apparatus to perform:
- updating the data in the metadata fields of the collection table to be consistent with the data in the metadata fields of the home metadata repository and the data in the metadata fields of the at least one specific remote metadata repository when change, with respect to said at least one previous synchronization, is determined to be made to the data in the metadata fields of the home metadata repository and to data in the metadata fields of the at least one specific remote metadata repository.

23. The computer readable medium of claim 19, wherein the instructions further the apparatus to perform:
- saving at least one metadata field, determined to be added in the home repository with respect to said at least one previous synchronization, to the metadata fields of the at least one specific remote metadata repository and to the metadata fields of the collection table.

24. The computer readable medium of claim 19, wherein the instructions further the apparatus to perform:
- deleting at least one metadata field, determined to be deleted from the home metadata repository with respect to said at least one previous synchronization, from the at least one specific remote metadata repository and from the at least one metadata field of the collection table.

* * * * *